United States Patent
Raghavan et al.

(10) Patent No.: US 8,371,983 B2
(45) Date of Patent: Feb. 12, 2013

(54) HYBRID TRANSMISSION

(75) Inventors: Madhusudan Raghavan, West Bloomfield, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 702 days.

(21) Appl. No.: 12/544,501

(22) Filed: Aug. 20, 2009

(65) Prior Publication Data

US 2011/0045931 A1 Feb. 24, 2011

(51) Int. Cl.
| F16H 3/72 | (2006.01) |
| F16H 37/06 | (2006.01) |
| F16H 47/04 | (2006.01) |
| F16H 3/44 | (2006.01) |
| B60K 6/445 | (2007.10) |

(52) U.S. Cl. ............ 475/280; 475/5; 475/10; 475/72; 475/83; 475/296; 475/311; 475/317; 475/323; 180/65.235

(58) Field of Classification Search .......... 475/275–293, 475/296, 311–313, 317–319, 323–325, 4, 475/5, 10, 72–83; 180/65.235
See application file for complete search history.

(56) References Cited

U.S. PATENT DOCUMENTS

| 5,931,757 | A | 8/1999 | Schmidt | |
|---|---|---|---|---|
| 6,746,354 | B1 | 6/2004 | Ziemer | |
| 7,220,201 | B2 | 5/2007 | Raghavan | |
| 7,235,029 | B2 | 6/2007 | Klemen | |
| 7,481,731 | B2 | 1/2009 | Usoro | |
| 2005/0178593 | A1* | 8/2005 | Oshidari | 180/65.2 |
| 2006/0046886 | A1* | 3/2006 | Holmes et al. | 475/5 |
| 2006/0276289 | A1* | 12/2006 | Hirata et al. | 475/5 |
| 2007/0049444 | A1* | 3/2007 | Gumpoltsberger et al. | 475/5 |
| 2008/0176697 | A1* | 7/2008 | Raghavan et al. | 475/5 |
| 2009/0098970 | A1* | 4/2009 | Kimes | 475/5 |
| 2009/0176611 | A1* | 7/2009 | Avery | 475/5 |

OTHER PUBLICATIONS

Kamichi, Hybrid System Development for a High-Performance Rear Drive Vehicle; SAE Technical Paper Series; SAE 2006-01-1338; Warrendale, PA USA.

* cited by examiner

*Primary Examiner* — Tisha Lewis

(57) ABSTRACT

A hybrid transmission is configured to transfer mechanical power to an output member and includes an input member, an output member, and a transmission case circumscribing first and second differential gear sets, each differential gear set including a plurality of meshingly engaged rotatable elements. The first differential gear set is configured with four nodes for transferring mechanical power, and the second differential gear set is configured with three nodes for transferring mechanical power. Two of the four nodes of the first differential gear set are continuously interconnected to two of the three nodes of the second differential gear set. A first torque transfer clutch is configured to selectively connect the input member to an internal combustion engine. First and second brake devices are configured to selectively interconnect elements of the first and second differential gear sets, the transmission case, the input member, and the output member.

19 Claims, 5 Drawing Sheets

HYBRID TRANSMISSION

TECHNICAL FIELD

This disclosure is related to hybrid transmission devices to transfer mechanical power for a powertrain system.

BACKGROUND

The statements in this section merely provide background information related to the present disclosure and may not constitute prior art.

Powertrain systems use transmission devices to transfer tractive torque between one or more torque generative devices and an output member connected to a driveline. A hybrid transmission device transfers torque between multiple torque generating devices and an output member, with the multiple torque generating devices configured to generate power by converting potential energy to mechanical power. The hybrid transmission device and torque generating devices can also operate to react vehicle kinetic energy to create storable potential energy.

One of the torque generating devices can include a reciprocating piston internal combustion engine. A transmission device transfers mechanical power in the form of speed and torque from the engine to a driveline. The hybrid powertrain system can permit engine operation that is somewhat independent from the power output from the transmission, deriving additional power to meet requirements from other torque-generating devices. This permits engine operation that is optimized for emissions and fuel efficiency. A power-split transmission can use differential gearing to achieve a continuously variable torque and speed ratio between input and output. An electrically variable transmission can use the differential gearing to send a portion of the transmitted power to one or more torque generating devices, with a remainder of the power sent through a parallel torque path to a driveline. One form of differential gearing includes a planetary gear set.

SUMMARY

A hybrid transmission is configured to transfer mechanical power to an output member and includes an input member, an output member, and a transmission case circumscribing first and second differential gear sets, each differential gear set including a plurality of meshingly engaged rotatable elements. The first differential gear set is configured with four nodes for transferring mechanical power, and the second differential gear set is configured with three nodes for transferring mechanical power. Two of the four nodes of the first differential gear set are continuously interconnected to two of the three nodes of the second differential gear set. A first torque transfer clutch is configured to selectively connect the input member to an internal combustion engine. First and second brake devices are configured to selectively interconnect elements of the first and second differential gear sets, the transmission case, the input member, and the output member.

BRIEF DESCRIPTION OF THE DRAWINGS

One or more embodiments will now be described, by way of example, with reference to the accompanying drawings, in which.

DETAILED DESCRIPTION

Figure 1:
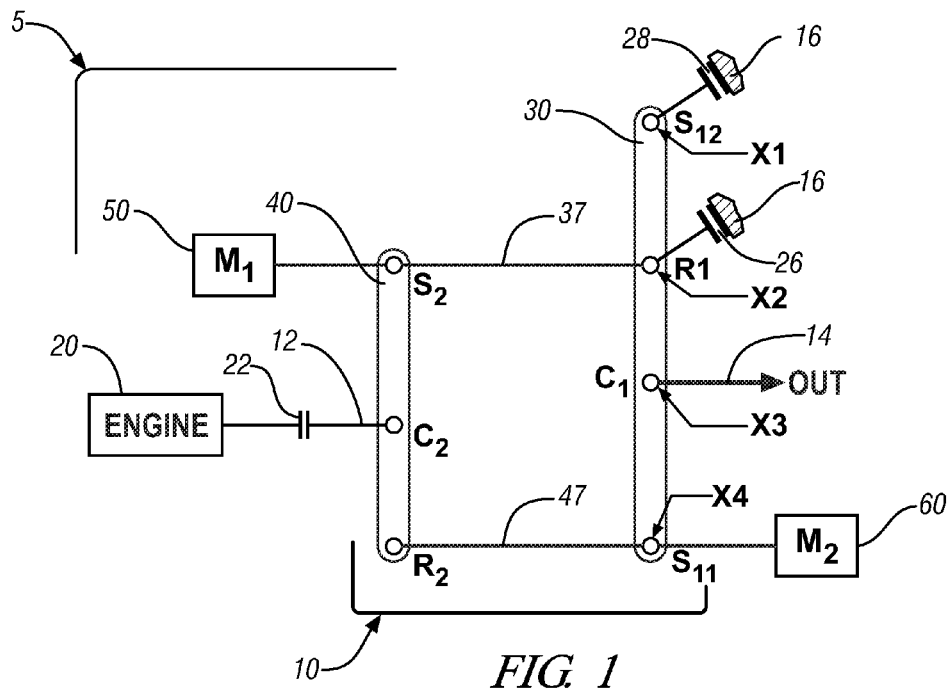
FIG. 1 is a two-dimensional schematic diagram of a powertrain system in accordance with the present disclosure.

Referring now to the drawings, wherein the showings are for the purpose of illustrating certain exemplary embodiments only and not for the purpose of limiting the same, FIG. 1 schematically illustrates a hybrid powertrain system 5 including the hybrid transmission 10 configured to transfer mechanical power between an input member 12 and an output member 14. Preferably the input member 12 can be selectively connected to an internal combustion engine 20, e.g., via application of a first clutch 22. The hybrid powertrain system 5 further includes first and second torque machines (M1) 50 and (M2) 60. In one embodiment the first and second torque machines 50 and 60 include electric motor/generator devices that interact with a power inverter device to convert electric power to mechanical power in a mechanical power generating mode and to convert vehicle kinetic energy to electric power in an electric power generating mode. When the first and second torque machines 50 and 60 include electric motor/generator devices, they each include a stator that preferably connects to a transmission case 16 and an associated rotor. The first torque machine 50 preferably generates a torque output sufficient to spin the engine 20 from a stopped position under cold operating conditions and provide output torque to the second torque machine 60 that is transferred to the output member 14. In one embodiment, the first torque machine 50 has a maximum torque output of 50 kW. The second torque machine 60 preferably generates a torque output to provide tractive torque to the output member 14 that is preferably connected to a driveline including vehicle wheels. In one embodiment, the second torque machine 60 has a maximum torque output of 100 kW. Torque output from the first and second torque machines 50 and 60 can be in the form of tractive torque that can be transferred through the hybrid transmission 10 to the driveline to propel the vehicle in either a forward or reverse direction. Torque output from the first and second torque machines 50 and 60 can be in the form of reactive torque that can be transferred through the hybrid transmission 10 to react torque from the driveline.

The hybrid transmission 10 includes a first differential gear set 30 and a second differential gear set 40. The first differential gear set 30 includes four nodes X1, X2, X3 and X4 including connecting points through which mechanical power in the form of torque and rotational speed can be transferred between the differential gear set 30 and other elements as described herein. The first differential gear set 30 includes a planetary gear set that includes at least one sun gear, and is shown including two sun gears, designated as S11 and S12 respectively. The first differential gear set 30 includes at least one carrier gear set C1 including a plurality of planet gears (not shown) and at least one ring gear designated as R1. The ring gear(s) R1 circumscribes the associated coaxial inner sun gear(s) S11 and S12, separated by the associated carrier gear set C1 including planet gears that simultaneously meshingly engage both the ring gear(s) and the sun gear(s) to rotate in concert to transfer torque across the four nodes X1, X2, X3 and X4.

The second first differential gear set 40 preferably includes a planetary gear set including elements including a sun gear S2, a carrier gear C2 set including a plurality of planet gears, and a ring gear R2.

The first differential gear set 30 continuously interconnects with the second differential gear set 40 at each of two separate nodes, i.e., connecting points through which mechanical power is transferred. The input member 12 mechanically couples to an element of the second differential gear set 40 that couples to an element of the first differential gear set 30 that couples to the output member 14. Alternative differential gear sets can include bevel gears or other gear sets arranged such that the rotational speed of at least one element of the gear set is a weighted average of rotational speeds of two other elements.

The first and second differential gear sets 30 and 40 continuously interconnect at two nodes on each of the first and second differential gear sets 30 and 40. The continuous interconnections include the ring gear R1 of the first differential gear set 30 fixedly connected to the sun gear S2 of the second differential gear set 40, preferably using a first interconnecting member 37, and the sun gear S11 of the first differential gear set 30 fixedly connected to the ring gear R2 of the second differential gear set 40 preferably using a second interconnecting member 47.

The hybrid transmission further includes the first clutch 22, a first brake 26, a second brake 28, and the transmission case 16.

The first differential gear set 30 includes the four nodes X1, X2, X3 and X4. The first node X1 includes a connecting point to selectively ground rotation of one of the elements of the first differential gear set 30 to the transmission case 16 for torque multiplication, preferably by applying the second brake 28.

The second node X2 includes a connecting point to selectively ground rotation of an element of the first differential gear set 30 to the transmission case 16, preferably by applying the first brake 26. The action of applying the first brake 26 further includes grounding rotation of the first interconnecting member 37, thus grounding rotation of the sun gear S2 of the second differential gear set 40 and any elements connected thereto, e.g., the engine 20 or the first torque machine 50.

The third node X3 includes a connecting point to transfer power between another of the elements of the first differential gear set 30 and the output member 14. The fourth node X4 includes a connecting point to transfer power between another of the elements of the first differential gear set 30 and the second torque machine 60. The fourth node X4 further includes a connecting point to transfer power between another of the elements of the second differential gear set 40 and the second torque machine 60.

The second brake device 28 can be applied to ground rotation of the second sun gear S12 to the transmission case 16 to enable operation of the second torque machine 60 at low speed.

The first brake device 26 can be applied to ground rotation of the first torque machine 50 to the transmission case 16 to enable a launch maneuver using the second torque machine 60.

The first clutch device 22 can be applied to spin the engine 20 to crank and start the engine 20 and to enable torque transfer between the engine 20 and the first differential gear set 30 to generate electric power through the first torque machine 50 and to provide tractive power through the second differential gear set 40.

In one embodiment, a second clutch device (shown as 24 in FIGS. 2-10) can be applied to lock rotation of selected elements of the first and second differential gear sets 30 and 40 to maximize torque transfer from the engine 20 and the first and second torque machines 50 and 60 to the output member 14 through the hybrid transmission 10.

The hybrid transmission 10 can transfer torque between the input member 12, the first and second torque machines 50 and 60, and the output member 14 across the first, second, third and fourth nodes X1, X2, X3 and X4 of the first differential gear set 30 by applying selected ones of the first clutch 22 and brakes 26 and 28, and selectively applying the second clutch 24. Specific operating states of the hybrid powertrain system 5 including the hybrid transmission 10 can be described with reference to Table 1, below:

TABLE 1

| Operating State | Engine Operation | Torque Generator | Brake 26 | Brake 28 | Clutch 22 | Clutch 24 |
|---|---|---|---|---|---|---|
| Engine Start (Vss = 0) | Off -> On | M1 (+) M2 (−) | | | x | |
| Engine Start - (Vss > 0) | Off -> On | M2 (+) | | | x | |
| Launch | Off | M2 (+) | x | | | |
| EV Low Speed | Off | M2 (+) | x | | | |
| EV High Speed | Off | M2 (+) | | x | | |
| EVT Highway | On or Off | M1 M2 Engine | | | x | |
| Fixed Gear- Electric Power assist | On | M1 M2 Engine | | | x | x |
| Reverse | Off | M2 (−) | x | | | | wherein the 'x' indicates that the corresponding clutch or brake is applied and the terms (+) and (−) indicate a rotational direction. When the engine 20 is 'Off', the engine 20 is unfueled and not spinning or otherwise rotating. When the engine 20 is 'On', the engine 20 is fueled and spinning.

The hybrid powertrain system 5 can operate in one of a plurality of operating states by operating the engine 20 in one of the On and Off states, and operating one or both the first and second torque machines (M1) 50 and (M2) 60, and applying selected ones of the clutches 22 and 24 and brakes 26 and 28. The vehicle operating states include vehicle launch (Launch), low speed electric vehicle operation (EV Low Speed), high speed electric vehicle operation (EV High Speed), highway operation in an electrically-variable transmission mode (EVT Highway), a fixed gear mode with electric power assist (Fixed Gear-Electric Power Assist), and reverse (Reverse). Operation in the fixed gear mode with electric power assist (Fixed Gear-Electric Power Assist) is effected by simultaneously locking first and second clutches 22 and 24 to lock rotation of the first and second differential gear sets 30 and 40 to maximize power transfer between the first and second torque machines 50 and 60, the engine 20, and the output member 14. Fixed gear operation is characterized by a fixed ratio between rotational speed of the engine 20 via the input member 12 and rotational speed of the output member 14.

FIGS. 2-10 show embodiments of the hybrid transmission 10 described in FIG. 1, including the input member 12, the output member 14, first and second differential gear sets 30 and 40, the first and second clutches 22 and 24, the first and second brakes 26 and 28, and the transmission case 16. Like numerals refer to like elements throughout the embodiments. In each embodiment, the second differential gear set 40 includes a sun gear 42, a carrier gear set 44, and a ring gear 46. The carrier gear set 44 connects to the engine 12 when clutch 22 is applied.

Figure 2:
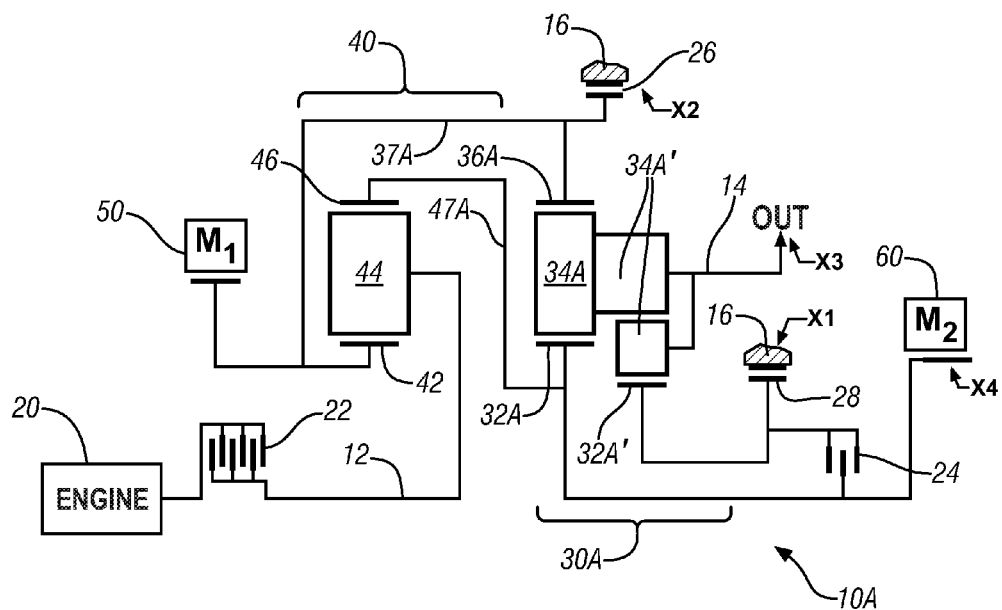
FIGS. 2-10 are two-dimensional schematic diagrams exemplifying embodiments of a hybrid powertrain system in accordance with the present disclosure.

FIG. 2 shows an embodiment of the hybrid transmission 10A including the input member 12, the output member 14, first and second differential gear sets 30A and 40, the first and second clutches 22 and 24, the first and second brakes 26 and 28, and the transmission case 16. Like numerals refer to like elements throughout the embodiments. The first differential gear set 30A includes two coaxial sun gears including a first sun gear 32A and a second sun gear 32A', a carrier gear set 34A, 34A' including a complex planet gear set, and a ring gear 36A. The first sun gear 32A and the second sun gear 32A' rotate independently, or rotate synchronously when clutch 24 is applied.

The two interconnections between the first and second differential gear sets 30A and 40 in this embodiment include the ring gear 36A fixedly connected to the sun gear 42 using a first interconnecting member 37A, and the first sun gear 32A fixedly connected to the ring gear 46 using a second interconnecting member 47A.

The first node X1 includes the connecting point between the first differential gear set 30A and the transmission case 16, which includes selectively applying the second brake device 28 to ground rotation of the second sun gear 32A' to the transmission case 16 in this embodiment.

The second node X2 includes the connecting point to selectively ground rotation of the ring gear 36A of the first differential gear set 30A and thus ground rotation of the first torque machine 50 and the sun gear 42 of the second differential gear set 40. This includes selectively applying the first brake 26 to ground rotation of the ring gear 36A and the first interconnecting member 37A to the transmission case 16 in this embodiment.

The third node X3 includes a connecting point to transfer power between the carrier gear set 34A' of the first differential gear set 30A and the output member 14 in this embodiment.

The fourth node X4 includes a connecting point to transfer power between the first sun gear 32A of the first differential gear set 30A and the second torque machine 60 in this embodiment.

Figure 3:
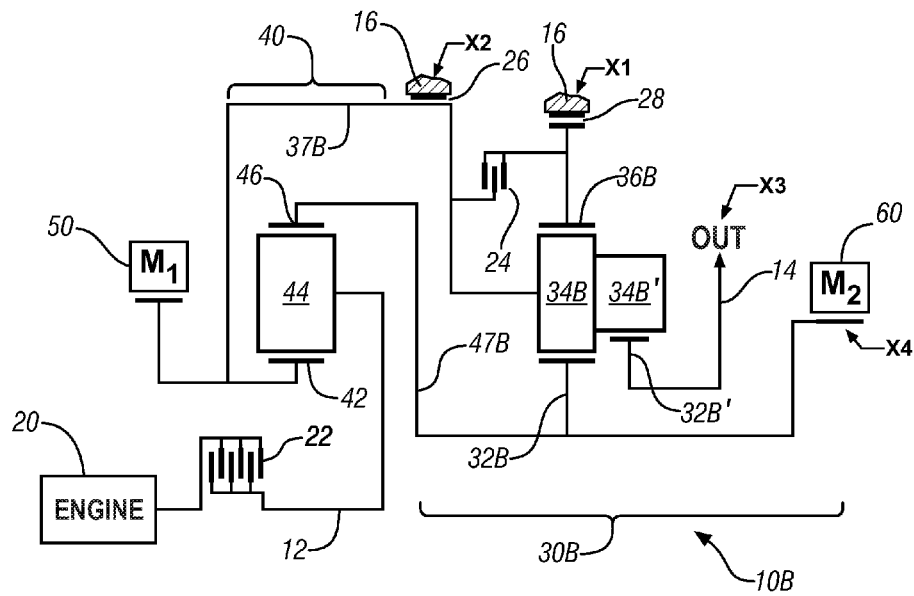

FIG. 3 shows another embodiment of the hybrid transmission 10B including input member 12, output member 14, first and second differential gear sets 30B and 40, the first and second clutches 22 and 24, the first and second brakes 26 and 28, and the transmission case 16. Like numerals refer to like elements. The first differential gear set 30B includes two coaxial sun gears including a first sun gear 32B and a second sun gear 32B', a carrier gear set with rotationally connected coaxial elements 34B and 34B', and a ring gear 36B. The first sun gear 32B and the second sun gear 32B' rotate independently.

The two interconnections between the first and second differential gear sets 30B and 40 in this embodiment include the carrier gear set 34B fixedly connected to the sun gear 42 using a first interconnecting member 37B, and the first sun gear 32B fixedly connected to the ring gear 46 using a second interconnecting member 47B.

The first node X1 includes the connecting point to transfer power between the first differential gear set 30B and the transmission case 16, which includes selectively applying the second brake device 28 to ground rotation of the ring gear 36B to the transmission case 16 in this embodiment.

The second node X2 includes the connecting point to selectively ground rotation of the carrier gears 34B and 34B' of the first differential gear set 30B and ground rotation of the first torque machine 50 via the sun gear 42 of the second differential gear set 40. This includes selectively applying first brake 26 to ground rotation of the first interconnecting member 37B and the carrier gears 34B and 34B' to the transmission case 16 in this embodiment.

The third node X3 includes a connecting point to transfer power between the second sun gear 32B' of the first differential gear set 30B and the output member 14 in this embodiment.

The fourth node X4 includes a connecting point to transfer power between the first sun gear 32B of the first differential gear set 30B and the second torque machine 60 in this embodiment.

Figure 4:
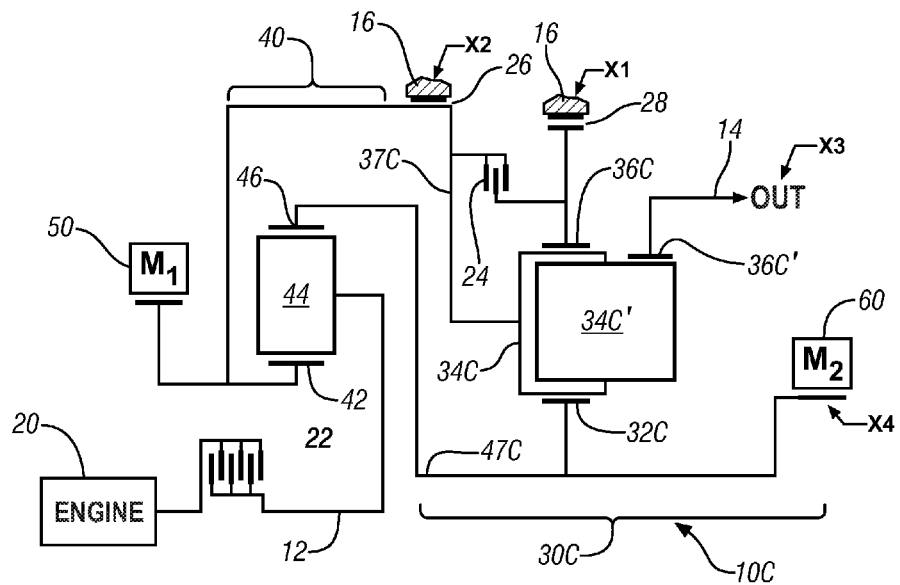

FIG. 4 shows another embodiment of the hybrid transmission 10C including the input member 12, the output member 14, the first and second differential gear sets 30C and 40, the first and second clutches 22 and 24, the first and second brakes 26 and 28, and the transmission case 16. Like numerals refer to like elements. The first differential gear set 30C includes a single sun gear 32C, a complex carrier gear set 34C that rotationally connects to a first ring gear 36C and a second ring gear 36C'. The first ring gear 36C and the second ring gear 36C' rotate independently.

The two interconnections between the first and second differential gear sets 30C and 40 in this embodiment include the carrier gear set 34C fixedly connected to the sun gear 42 using a first interconnecting member 37C, and the sun gear 32C fixedly connected to the ring gear 46 using a second interconnecting member 47C.

The first node X1 includes the connecting point to transfer power between the first differential gear set 30C and the transmission case 16, which includes selectively applying the second brake device 28 to ground rotation of the first ring gear 36C to the transmission case 16 in this embodiment.

The second node X2 includes the connecting point to selectively ground rotation of the carrier set 34C of the first differential gear set 30C and thus ground rotation of the first torque machine 50 and the sun gear 42 of the second differential gear set 40. This includes selectively applying the first brake 26 to ground rotation of the first interconnecting member 37C to the transmission case 16 in this embodiment.

The third node X3 includes a connecting point to transfer power between the second ring gear 36C' of the first differential gear set 30C and the output member 14 in this embodiment.

The fourth node X4 includes a connecting point to transfer power between the sun gear 32C of the first differential gear set 30C and the second torque machine 60 in this embodiment.

Figure 5:
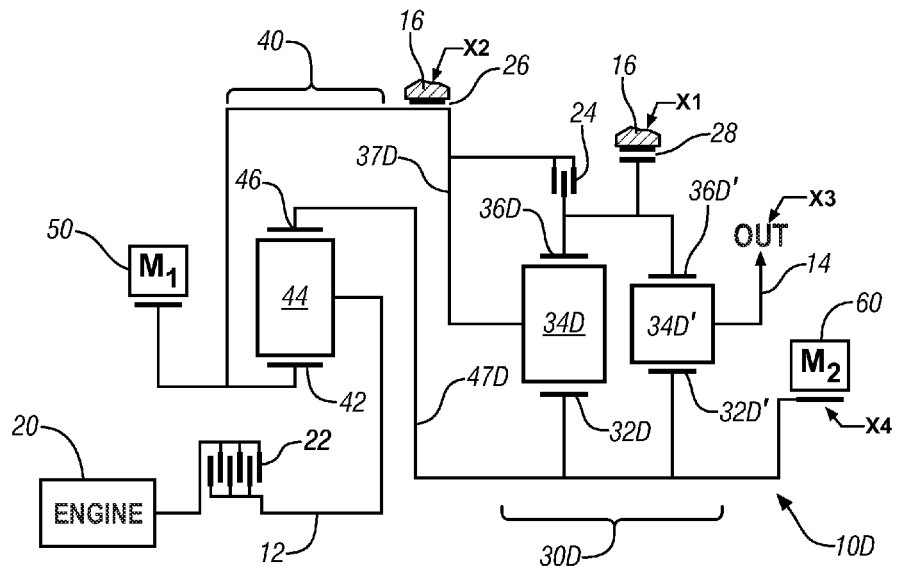

FIG. 5 shows another embodiment of the hybrid transmission 10D including the input member 12, the output member 14, first and second differential gear sets 30D and 40, the first and second clutches 22 and 24, the first and second brakes 26 and 28, and the transmission case 16. Like numerals refer to like elements. The first differential gear set 30D includes rotationally connected first and second sun gears 32D and 32D', coaxial, independently rotating first and second carrier gear sets 34D and 34D' that are rotatably connected to rotationally connected ring gears 36D and 36D'.

The two interconnections between the first and second differential gear sets 30D and 40 in this embodiment include the first carrier gear set 34D fixedly connected to the sun gear 42 using a first interconnecting member 37D, and the first and second sun gears 32D and 32D' fixedly connected to the ring gear 46 using a second interconnecting member 47D.

The first node X1 includes the connecting point to transfer power between the first differential gear set 30D and the transmission case 16, which includes selectively applying the second brake device 28 to ground rotation of the ring gears 36D and 36D' to the transmission case 16 in this embodiment.

The second node X2 includes the connecting point to selectively ground rotation of the first carrier set 34D of the first differential gear set 30D and thus ground rotation of the first torque machine 50 and the sun gear 42 of the second differential gear set 40. This includes selectively applying the first brake 26 to ground rotation of the first interconnecting member 37D to the transmission case 16 in this embodiment.

The third node X3 includes a connecting point to transfer power between a planet gear of the second carrier gear set 34D' of the first differential gear set 30D and the output member 14 in this embodiment.

The fourth node X4 includes connecting points to transfer power between the first and second sun gears 32D and 32D' of the first differential gear set 30D and the second torque machine 60 in this embodiment.

Figure 6:
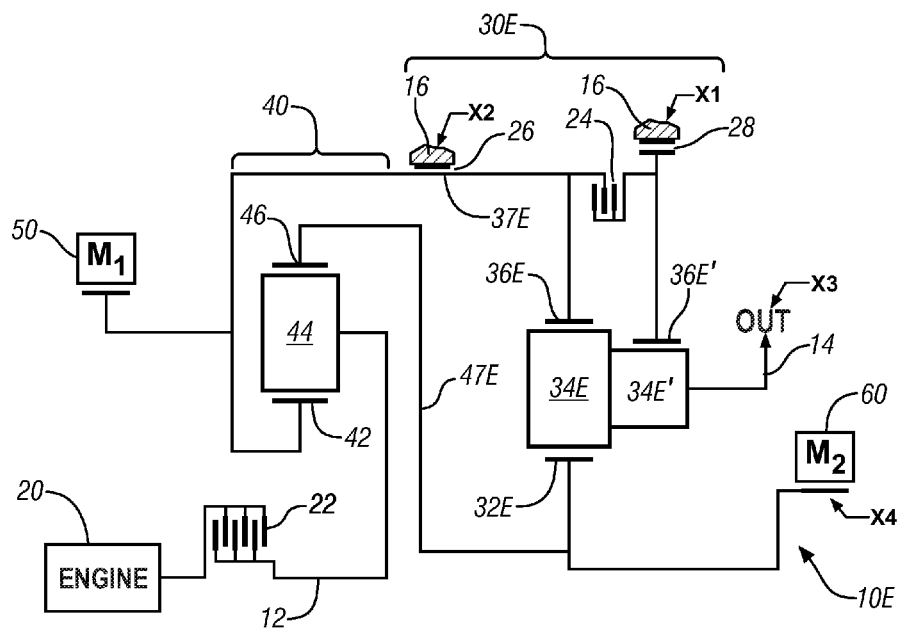

FIG. 6 shows another embodiment of the hybrid transmission 10E including the input member 12, the output member 14, first and second differential gear sets 30E and 40, the first and second clutches 22 and 24, the first and second brakes 26 and 28, and the transmission case 16. Like numerals refer to like elements. The first differential gear set 30E includes sun gear 32E, carrier gear set including planet gears 34E and 34E' rotationally connected to first and second ring gears 36E and 36E' respectively. The first and second ring gears 36E and 36E' rotate independently, and can be rotationally fixed by applying clutch 24.

The two interconnections between the first and second differential gear sets 30E and 40 in this embodiment include the first ring gear 36E fixedly connected to the sun gear 42 using a first interconnecting member 37E, and the sun gear 32E fixedly connected to the ring gear 46 using a second interconnecting member 47E.

The first node X1 includes the connecting point to transfer power between the first differential gear set 30E and the transmission case 16, which includes selectively applying the second brake device 28 to ground rotation of the second ring gear 36E' to the transmission case 16 in this embodiment.

The second node X2 includes the connecting point to selectively ground rotation of the first ring gear 36E of the first differential gear set 30E and the first torque machine 50 and the sun gear 42 of the second differential gear set 40. This includes selectively applying first brake 26 to ground rotation of the first interconnecting member 37E to the transmission case 16 in this embodiment.

The third node X3 includes a connecting point to transfer power between the carrier gear set 34, 34E' of the first differential gear set 30E and the output member 14 in this embodiment.

The fourth node X4 includes a connecting point to transfer power between the sun gear 32E of the first differential gear set 30E and the second torque machine 60 in this embodiment.

Figure 7:
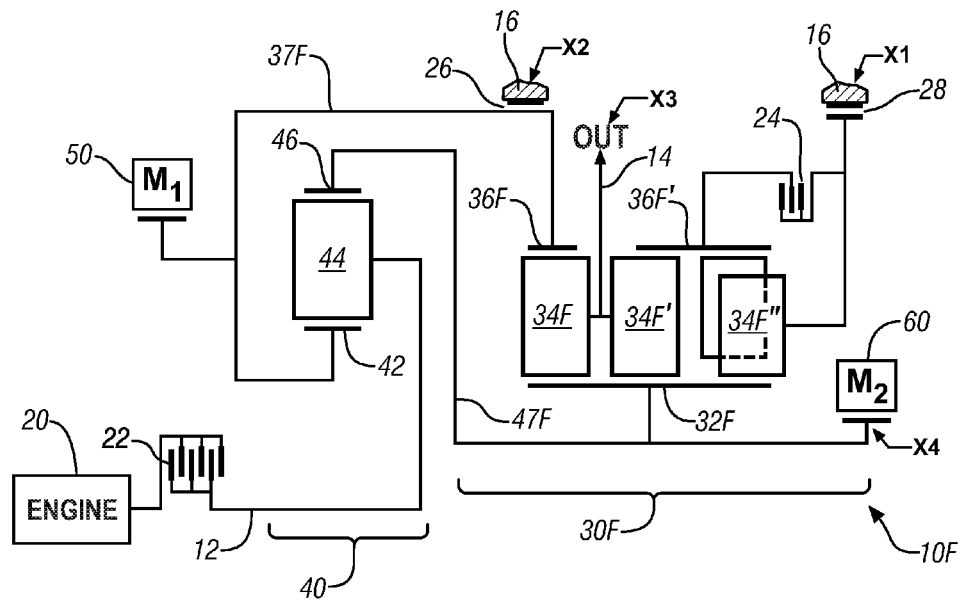

FIG. 7 shows another embodiment of the hybrid transmission 10F including the input member 12, the output member 14, first and second differential gear sets 30F and 40, the first and second clutches 22 and 24, the first and second brakes 26 and 28, and the transmission case 16. Like numerals refer to like elements. The first differential gear set 30F includes sun gear 32F, compound, complex carrier gear set including interconnected first, second and third carrier gear sets 34F, 34F', 34F", and ring gears 36F and 36F'.

The two interconnections between the first and second differential gear sets 30F and 40 in this embodiment include the first ring gear 36F fixedly connected to the sun gear 42 using a first interconnecting member 37F, and the sun gear 32F fixedly connected to the ring gear 46 using a second interconnecting member 47F.

The first node X1 includes the connecting point to transfer power between the first differential gear set 30F and the transmission case 16, which includes selectively applying the second brake device 28 to ground rotation of the third carrier gear set 34F" to the transmission case 16 in this embodiment.

The second node X2 includes the connecting point to selectively ground rotation of the ring gear 36F of the first differential gear set 30F and the first torque machine 50 and the sun gear 42 of the second differential gear set 40. This includes selectively applying the first brake 26 to ground rotation of the first interconnecting member 37F to the transmission case 16 in this embodiment.

The third node X3 includes a connecting point to transfer power between the first and second carrier gear sets 34F and 34F' of the first differential gear set 30F and the output member 14 in this embodiment.

The fourth node X4 includes a connecting point to transfer power between the sun gear 32F of the first differential gear set 30F and the second torque machine 60 in this embodiment.

Figure 8:
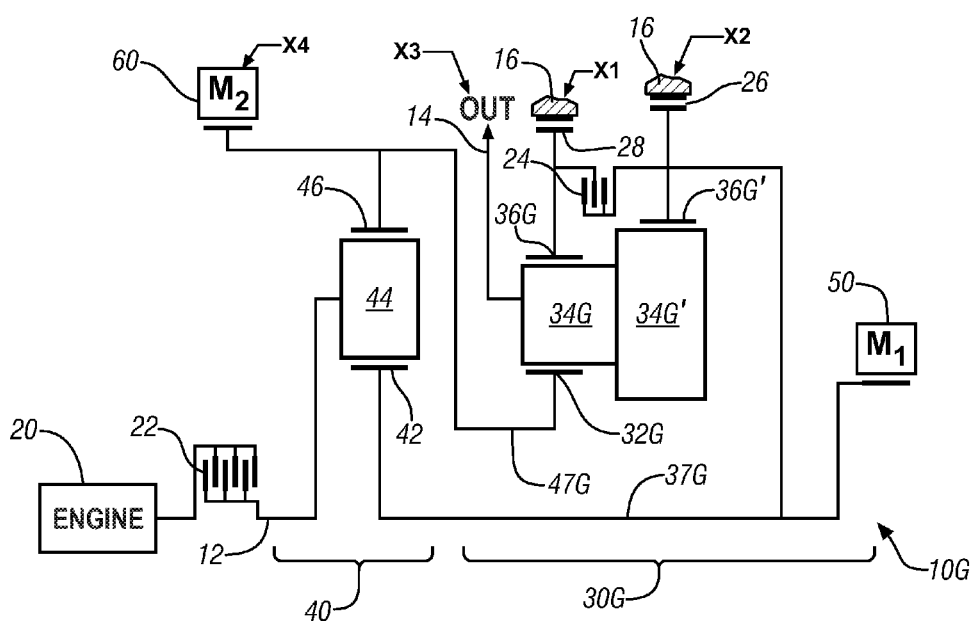

FIG. 8 shows another embodiment of the hybrid transmission 10G including the input member 12, the output member 14, first and second differential gear sets 30G and 40, the first and second clutches 22 and 24, the first and second brakes 26 and 28, and the transmission case 16. Like numerals refer to like elements. The first differential gear set 30G includes sun gear 32G, carrier gear sets 34G and 34G', and first and second ring gears 36G and 36G'.

The two interconnections between the first and second differential gear sets 30G and 40 in this embodiment include the second ring gear 36G' fixedly connected to the sun gear 42 using a first interconnecting member 37G, and the sun gear 32G fixedly connected to the ring gear 46 using a second interconnecting member 47G.

The first node X1 includes the connecting point to transfer power between the first differential gear set 30G and the transmission case 16. This includes selectively applying the second brake device 28 to ground rotation of the first ring gear 36G to the transmission case 16 in this embodiment.

The second node X2 includes the connecting point to selectively ground rotation of the second ring gear 36G' of the first differential gear set 30G and the first torque machine 50 and the sun gear 42 of the second differential gear set 40. This includes selectively applying first brake 26 to ground rotation of the first interconnecting member 37G to the transmission case 16 in this embodiment.

The third node X3 includes a connecting point to transfer power between a planet gear of the carrier gear set 34G of the first differential gear set 30G and the output member 14 in this embodiment.

The fourth node X4 includes a connecting point to transfer power between the sun gear 32G of the first differential gear set 30G and the second torque machine 60 in this embodiment, which is connected to the ring gear 46 of the second differential gear set 40 via the second interconnecting member 47G.

Figure 9:
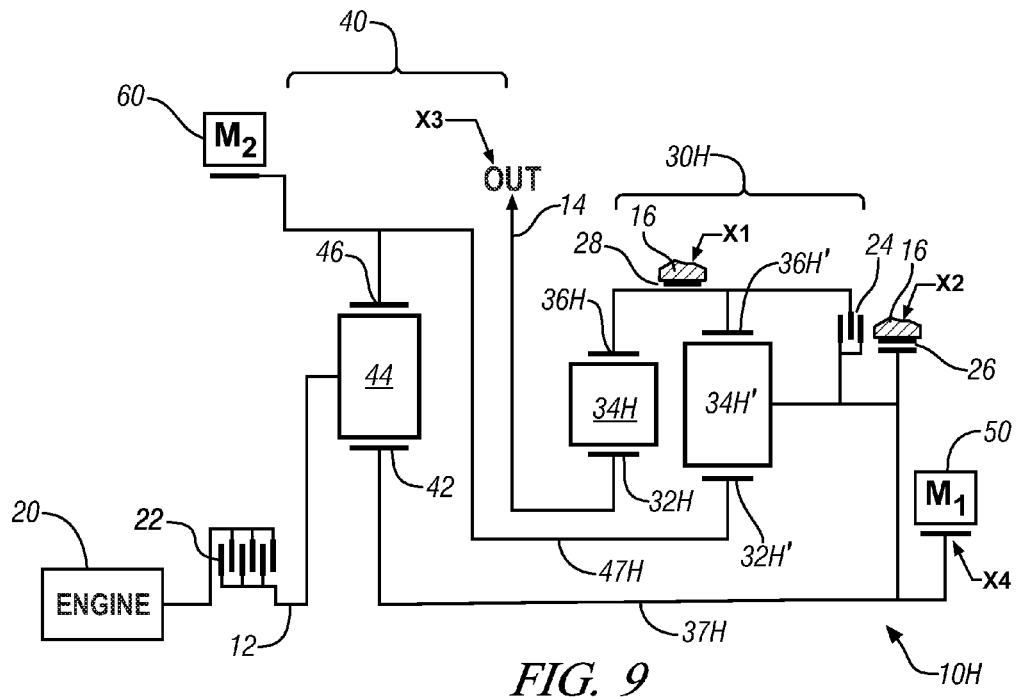

FIG. 9 shows another embodiment of the hybrid transmission 10H including the input member 12, the output member 14, first and second differential gear sets 30H and 40, the first and second clutches 22 and 24, the first and second brakes 26 and 28, and the transmission case 16. Like numerals refer to like elements. The first differential gear set 30H includes first and second sun gears 32H and 32H', first and second carrier gear sets 34H and 34H', and first and second ring gears 36H and 36H'. The first and second ring gears 36H and 36H' are rotationally fixed.

The two interconnections between the first and second differential gear sets 30H and 40 in this embodiment include the second carrier gear 34H' fixedly connected to the sun gear 42 using a first interconnecting member 37H, and the second sun gear 32H' fixedly connected to the ring gear 46 using a second interconnecting member 47H.

The first node X1 includes the connecting point to transfer power between the first differential gear set 30H and the transmission case 16. This includes selectively applying the second brake device 28 to ground rotation of the first and second ring gears 36H and 36H' to the transmission case 16 in this embodiment.

The second node X2 includes the connecting point to selectively ground rotation of the second carrier gear 34H' of the first differential gear set 30H and the first torque machine 50 and the sun gear 42 of the second differential gear set 40. This includes selectively applying first brake 26 to ground rotation of the first interconnecting member 37H in this embodiment.

The third node X3 includes a connecting point to transfer power between the sun gear 32H of the first differential gear set 30H and the output member 14 in this embodiment.

The fourth node X4 includes a connecting point to transfer power between the carrier gear 34H' of the first differential gear set 30H and the second torque machine 60 in this embodiment, which is connected to the ring gear 46 of the second differential gear set 40.

Figure 10:
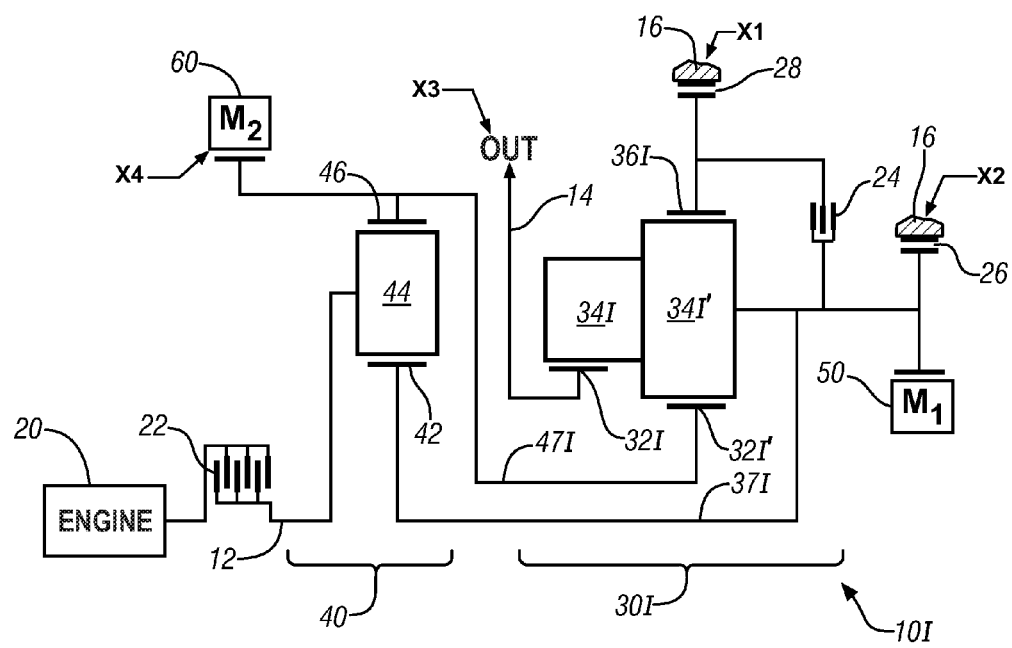

FIG. 10 shows another embodiment of the hybrid transmission 10I including the input member 12, the output member 14, first and second differential gear sets 30I and 40, the first and second clutches 22 and 24, the first and second brakes 26 and 28, and the transmission case 16. Like numerals refer to like elements. The first differential gear set 30I includes first and second sun gears 32I and 32I', compound carrier gear set 34I and 34I', and ring gear 36I.

The two interconnections between the first and second differential gear sets 30I and 40 in this embodiment include the compound carrier gear set 34I and 34I' fixedly connected to the sun gear 42 using a first interconnecting member 37I, and the second sun gear 32I' fixedly connected to the ring gear 46 using a second interconnecting member 47I.

The first node X1 includes the connecting point to transfer power between the first differential gear set 30I and the transmission case 16. This includes selectively applying the second brake device 28 to ground rotation of the ring gear 36I to the transmission case 16 in this embodiment.

The second node X2 includes the connecting point to selectively ground rotation of the complex carrier gear set 34I and 34I' of the first differential gear set 30I and the first torque machine 50 and the sun gear 42 of the second differential gear set 40. This includes selectively applying the first brake 26 to ground rotation of the compound carrier gear set 34I and 34I' to the transmission case 16 in this embodiment.

The third node X3 includes a connecting point to transfer power between the first sun gear 32I of the first differential gear set 30I and the output member 14 in this embodiment.

The fourth node X4 includes a connecting point to transfer power between the second sun gear 32I' and the second torque machine 60 in this embodiment, which is connected to the ring gear 46 of the second differential gear set 40.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Hybrid transmission configured to transfer mechanical power to an output member, comprising:
an input member and an output member;
a transmission case circumscribing first and second differential gear sets, each differential gear set comprising a plurality of meshingly engaged rotatable elements;
the first differential gear set configured with four nodes for transferring mechanical power;
the second differential gear set configured with three nodes for transferring mechanical power;
two of the four nodes of the first differential gear set continuously interconnected to two of the three nodes of the second differential gear set; and
a first torque transfer clutch configured to selectively connect the input member to an internal combustion engine;
first and second brake devices configured to selectively interconnect elements of the first and second differential gear sets, the transmission case, the input member, and the output member;
wherein a second one of the four nodes of the first differential gear set comprises a connecting point to continuously interconnect a second one of the elements of the first differential gear set to a first one of the elements of the second differential gear set; and
wherein the second one of the four nodes of the first differential gear set comprises a connecting point to selectively ground rotation of the second one of the elements of the first differential gear set to the transmission case by applying the first brake.

2. The hybrid transmission of claim 1, further comprising a second torque transfer clutch configured to selectively interconnect elements of the first and second differential gear sets to effect fixed gear operation.

3. The hybrid transmission of claim 1, wherein a first one of the four nodes of the first differential gear set comprises a connecting point to selectively ground rotation of a first one of the elements of the first differential gear set to the transmission case by applying the second brake.

4. The hybrid transmission of claim 1, wherein a third one of the four nodes of the first differential gear set comprises a connecting point to transfer power between a third one of the elements of the first differential gear set and the output member.

5. The hybrid transmission of claim 1, wherein a fourth one of the four nodes of the first differential gear set comprises a connecting point to transfer power between a fourth one of the elements of the first differential gear set and a second one of the elements of the second differential gear set.

6. Hybrid transmission configured to transfer mechanical power to an output member, comprising:
an input member and an output member;
a transmission case circumscribing first and second differential gear sets, each differential gear set comprising a plurality of meshingly engaged rotatable elements;
the first differential gear set configured with four nodes for transferring mechanical power;
the second differential gear set configured with three nodes for transferring mechanical power;
two of the four nodes of the first differential gear set continuously interconnected to two of the three nodes of the second differential gear set; and
a first torque transfer clutch configured to selectively connect the input member to an internal combustion engine;
first and second brake devices configured to selectively interconnect elements of the first and second differential gear sets, the transmission case, the input member, and the output member;
wherein a second one of the four nodes of the first differential gear set comprises a connecting point to continuously interconnect a second one of the elements of the first differential gear set to a first one of the elements of the second differential gear set; and wherein the second one of the four nodes of the first differential gear set further comprises a connecting point to transfer power between the second one of the elements of the first differential gear set and a first torque machine.

7. Hybrid transmission configured to transfer mechanical power to an output member, comprising:
an input member and an output member;
a transmission case circumscribing first and second differential gear sets, each differential gear set comprising a plurality of meshingly engaged rotatable elements;
the first differential gear set configured with four nodes for transferring mechanical power;
the second differential gear set configured with three nodes for transferring mechanical power;
two of the four nodes of the first differential gear set continuously interconnected to two of the three nodes of the second differential gear set;
a first torque transfer clutch configured to selectively connect the input member to an internal combustion engine; and
first and second brake devices configured to selectively interconnect elements of the first and second differential gear sets, the transmission case, the input member, and the output member;
wherein a fourth one of the four nodes of the first differential gear set comprises a connecting point to transfer power between a fourth one of the elements of the first differential gear set and a second one of the elements of the second differential gear set; and
wherein the fourth one of the four nodes of the first differential gear set further comprises a connecting point to transfer power between the fourth one of the elements of the first differential gear set and a second torque machine.

8. Hybrid powertrain system configured to transfer mechanical power to a driveline, comprising:
an internal combustion engine configured to selectively transfer torque to an input member of a hybrid transmission via a first torque transfer clutch device,
a hybrid transmission including the input member, an output member, and a transmission case circumscribing first and second differential gear sets, each differential gear set comprising a plurality of meshingly engaged rotatable elements, the first differential gear set configured with four nodes for transferring mechanical power, the second differential gear set configured with three nodes for transferring mechanical power, two of the four nodes of the first differential gear set continuously interconnected to two of the three nodes of the second differential gear set, and first and second brake devices configured to selectively interconnect elements of the first and second differential gear sets, the transmission case, the input member, and the output member; and
first and second torque machines configured to transfer torque to selected nodes of one of the first and second differential gear sets;
wherein the hybrid transmission applies the second brake device to ground one of the elements of the first differential gear set to transfer tractive torque to the output member to effect a high speed electric vehicle operating state.

9. The hybrid powertrain system of claim 8, wherein the hybrid transmission further comprises a second torque transfer clutch configured to selectively interconnect elements of the first and second differential gear sets to effect fixed gear operation.

10. The hybrid powertrain system of claim 8, wherein the hybrid transmission applies the first torque transfer clutch to transfer torque from one of the first and second torque machines to effect an engine start operating state.

11. The hybrid powertrain system of claim 10, wherein the hybrid transmission device is configured to spin the input member when the first torque transfer clutch is applied and the first torque machine rotates in a first direction and the second torque machine rotates in a second, opposite direction such that rotational speed of the output member is nil.

12. The hybrid powertrain system of claim 10, wherein the hybrid transmission is configured to spin the input member when the first torque transfer clutch is applied and the second torque machine rotates in a first direction such that rotational speed of the output member is in a positive direction.

13. The hybrid powertrain system of claim 8, wherein the engine is in an off state during powertrain operation in one of a reverse operating state, a low speed electric vehicle operating state, and a launch operating state.

14. The hybrid powertrain system of claim 13, wherein the hybrid transmission applies the first brake device to ground one of the elements of the first differential gear set to transfer tractive torque to the output member to effect the launch operating state.

15. The hybrid powertrain system of claim 13, wherein the hybrid transmission applies the first brake device to ground one of the elements of the first differential gear set to transfer tractive torque to the output member to effect the low speed electric vehicle operating state.

16. The hybrid powertrain system of claim 13, wherein the hybrid transmission applies the first brake device to ground one of the elements of the first differential gear set to transfer tractive torque to the output member to effect the reverse operating state.

17. The hybrid powertrain system of claim 8, wherein the engine is in an off state during powertrain operation in the high speed electric vehicle operating state.

18. The hybrid powertrain system of claim 8, wherein the hybrid transmission applies the first torque transfer clutch to transfer tractive torque from the engine to the hybrid transmission to effect an electrically-variable transmission operating state.

19. The hybrid powertrain system of claim 18, wherein the engine is in an on state during powertrain operation in the electrically-variable transmission operating state.

* * * * *